(12) United States Patent
Takeuchi et al.

(10) Patent No.: US 8,619,321 B2
(45) Date of Patent: Dec. 31, 2013

(54) RECORDING CONTROL DEVICE AND RECORDING CONTROL METHOD

(75) Inventors: Yasuhiro Takeuchi, Nagano (JP); Yukiharu Horiuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1036 days.

(21) Appl. No.: 12/344,892

(22) Filed: Dec. 29, 2008

(65) Prior Publication Data

US 2009/0168107 A1    Jul. 2, 2009

(30) Foreign Application Priority Data

Dec. 27, 2007  (JP) ................................. 2007-337327

(51) Int. Cl.
*G06K 15/00* (2006.01)
*G06F 3/12* (2006.01)

(52) U.S. Cl.
USPC .......................................... 358/1.8; 358/1.15

(58) Field of Classification Search
None
See application file for complete search history.

(56) References Cited

U.S. PATENT DOCUMENTS

| | | | |
|---|---|---|---|
| 5,493,421 A | 2/1996 | Uetama et al. | |
| 6,663,303 B2 * | 12/2003 | Horiuchi et al. | 400/61 |
| 8,009,317 B2 | 8/2011 | Nagata | |
| 2002/0164185 A1 * | 11/2002 | Horiuchi et al. | 400/76 |
| 2003/0072597 A1 * | 4/2003 | Someno | 400/621 |
| 2006/0140654 A1 * | 6/2006 | Takiguchi et al. | 399/45 |
| 2009/0168107 A1 * | 7/2009 | Takeuchi et al. | 358/1.18 |
| 2009/0262394 A1 * | 10/2009 | Adachi et al. | 358/1.15 |

FOREIGN PATENT DOCUMENTS

| | | |
|---|---|---|
| EP | 1223043 A1 | 7/2002 |
| EP | 1739541 A2 | 1/2007 |
| JP | 6038001 | 2/1994 |
| JP | 2000025297 A | 1/2000 |
| JP | 2000141774 | 5/2000 |
| JP | 2003-191564 A | 7/2003 |
| JP | 2005094413 | 4/2005 |
| KR | 2005-0079980 A | 8/2005 |
| KR | 10-2008-0026417 A | 3/2008 |
| KR | 10-1148518 B1 | 5/2012 |
| TW | 463099 B | 11/2001 |

OTHER PUBLICATIONS

European Search Report issued on Jun. 2, 2010 in the corresponding EP Application No. 08022209.4.

* cited by examiner

*Primary Examiner* — Vincent Rudolph
*Assistant Examiner* — Marcus T Riley
(74) *Attorney, Agent, or Firm* — Nutter McClennen & Fish LLP; John J. Penny, Jr.; Michael P. Visconti, III

(57) ABSTRACT

A recording control device includes an input section that inputs information on a recording direction of a recording object document and information on a blank space elimination function for recording; a setting section that performs settings relating to the recording direction of the recording object document and the blank space elimination function based on the information input by the input section; a recording control section that controls a recording apparatus to record the recording object document on a recording medium according to the settings performed by the setting section; and a determining section that determines whether the setting relating to the blank space elimination function needs to be changed.

6 Claims, 9 Drawing Sheets

RECORDING CONTROL DEVICE AND RECORDING CONTROL METHOD

Priority is claimed to Japanese Patent Application No. 2007-337327 filed Dec. 27, 2007, the disclosure of which, including the specification, drawings and claims, is incorporated herein by reference in its entirety.

BACKGROUND

1. Technical Field

The present invention relates to a recording control device and a recording control method for controlling a recording apparatus that records images.

2. Related Art

To save recording paper (recording medium), there is an apparatus that performs recording on a recording paper by deleting blank portions included in a recording object document (for example, refer to JP-A-6-038001). According to the apparatus described in JP-A-6-038001, when a predetermined number or more of consecutive blank lines each of which is one line extending in the width direction of a recording medium and is entirely blank, they are deleted and the remainder is recorded.

In a recording apparatus, settings relating to various operations in addition to the above-described blank portion deletion are possible, and for example, a recording direction (the relationship between the orientation of a recording medium and the orientation of a recording object document) can be optionally set. However, when the recording direction is changed, as a matter of course, the orientations and positions of blanks on the recording object document also change accordingly, so that settings relating to the blank portions to be deleted must be made again.

In other words, the function for eliminating blank portions for saving the recording medium is influenced by the contents of the settings relating to other functions, so that in conjunction with the change in the settings relating to other functions, consistency with the setting relating to the function for eliminating blank portions must be confirmed. Therefore, each time a setting is changed, an operation for confirming other settings is necessary, and the procedures of a setting change became complicated.

SUMMARY

An advantage of some aspects of at least one embodiment of the invention is to reduce labor when changing a setting and improve operability.

According to an aspect of at least one embodiment of the invention, there is provided a recording control device including: an input section that inputs information on a recording direction of a recording object document and information on a blank space elimination function for recording by eliminating blank spaces in the recording object document; a setting section that performs settings relating to the recording direction of the recording object document and the blank space elimination function based on the information input by the input section; a recording control section that controls a recording apparatus to record the recording object document on a recording medium according to the settings performed by the setting section; and a determining section that determines whether the setting relating to the blank space elimination function needs to be changed when information on a recording direction of the recording object document is newly input by the input section in a state where the setting section has performed the settings relating to the recording direction of the recording object document and the blank space elimination function.

With this configuration, in a state where information designating a recording direction of a recording object document and information on a blank space elimination function are input and settings relating to the recording direction and the blank space elimination function are made based on these peaces of information, when information showing a recording direction of the recording object document is newly input by the input section, it is determined whether the setting relating to the blank space elimination function needs to be changed. In other words, when an operation for changing the setting of the recording direction is performed, it is automatically determined whether the setting relating to the blank space elimination function that is influenced by this operation should be changed. Accordingly, when changing the setting of the recording direction, the operation for confirming the consistency with the setting of the blank space elimination function at this time can be omitted, the burden on an operator can be reduced, and the operability can be improved. Even if the confirmation when changing the setting of the recording direction is forgotten, recording with erroneous settings is prevented, so that the feeling of burden of the operator who makes settings can be reduced.

In the above-described configuration, it is also possible that the setting section automatically changes the setting relating to the blank space elimination function based on the information newly input by the input section when the determining section determines that the setting relating to the blank space elimination function needs to be changed.

In this case, when information showing a recording direction of the recording object document is newly input, if the setting relating to the blank space elimination function needs to be changed, it is automatically changed, so that the operation for confirming the consistency with the setting of the blank space elimination function and an operation for changing this setting can be omitted when changing the setting of the recording direction, so that the operation burden can be greatly reduced and the operability can be improved. Further, even if the confirmation when changing the setting of the recording direction is forgotten, the settings are properly changed, so that the feeling of burden of the operator who makes settings can be greatly reduced.

In the above-described configuration, it is also possible that the setting section sets whether a blank space positioned on an upper portion and a blank space positioned on a lower portion within a page of the recording object document are to be eliminated when recording, as the information on the blank space elimination function, based on the information input by the input section.

In this case, it can be set whether the blank space positioned on the upper portion and the blank space positioned on the lower portion within the page of the recording object document are to be eliminated when recording, so that when the up-down direction of the recording object document and the conveyance direction of the recording medium match each other, the recording medium can be especially efficiently saved. When an input for changing the recording direction is made, the settings relating to elimination of the blank spaces positioned on the upper and lower portions within the page are changed, so that even if confirmation in conjunction with the setting change is failed, a recording error such that the blank space that should not be eliminated is eliminated, caused by erroneous settings, can be prevented. Accordingly, in addition to efficient saving of the recording medium, the confirming operation when changing the setting and resetting can be omitted, and the operability can be further improved. Further, an advantage that a recording error due to erroneous settings can be prevented is obtained.

In the above-described configuration, it is also possible that when the information is input by the input section, selection candidates corresponding to combinations showing whether the blank space positioned on the upper portion and the blank space positioned on the lower portion within the page of the recording object document are to be eliminated when recording are listed on a display screen in a selectable manner, and the recording control device comprises a display control section that displays notification of a setting change on the display screen when the setting is automatically changed by the setting section based on determination made by the determining section.

In this case, when inputting, selection candidates corresponding to combinations showing whether the blank spaces positioned on the upper and lower portions within the page are to be eliminated are listed on a display screen in a selectable manner, so that by an operation for making selection among these listed selection candidates, an input is easily made. Further, when automatically changing a setting based on the determination made by the determining section, notification of the setting change is displayed on the display screen, so that an operator can know the automatic setting change immediately. Therefore, by using the indication on the display screen, inputting without errors by an easy input operation is enabled, and further, when setting is automatically changed, it is notified immediately, and accordingly, the operability can be remarkably improved.

In the above-described configuration, it is also possible that the determining section determines that the setting relating to the blank space elimination function needs to be changed when the recording direction of the recording object document newly input by the input section is a direction rotated from the recording direction of the recording object document that has already been set by the setting section exceeding 90 degrees but not more than 270 degrees, and the setting section changes the settings for the blank space positioned on the upper portion and the blank space positioned on the lower portion within the page of the recording object document are changed upside down when the determining section determines that the setting relating to the blank space elimination function needs to be changed.

In this case, when settings relating to elimination of the blank spaces positioned on the upper and lower portions within the page are made, if an input for rotating the recording direction exceeding 90 degrees but not more than 270 degrees is made, according to this input, the settings of the blank spaces are changed upside down, so that according to this change in recording direction, the settings can be automatically changed so as to prevent the relative positions of the blank spaces to be eliminated with respect to the orientation of the recording medium from being changed. Accordingly, the settings can be automatically properly changed so as not to lose the original settings intention, and the operation burden can be greatly reduced.

In the above-described configuration, it is also possible that the recording medium is a rolled long-length recording sheet.

In this case, in the configuration in which the economical effect and the effect on environmental load are remarkably obtained by saving the amount of use of the recording medium, the operation burden can be remarkably reduced and the operability can be improved.

According to an aspect of at least one embodiment of the invention, there is also provided a recording control method including: when information on a recording direction of a recording object document and information on a blank space elimination function for recording by eliminating blank spaces in the recording object document are input, performing settings relating to the recording direction of the recording object document and the blank space elimination function based on the input information; controlling a recording apparatus to record the recording object document on a recording medium according to the settings; and determining whether the setting relating to the blank space elimination function needs to be changed when information on a recording direction of the recording object document is newly input in a state where the settings relating to the recording direction of the recording object document and the blank space elimination function have been performed.

With this method, in a state where information designating a recording direction of a recording object document and information on a blank space elimination function are input and settings relating to the recording direction and the blank space elimination function are made based on these peaces of information, when information showing a recording direction of the recording object document is newly input, it is determined whether the setting relating to the blank space elimination function needs to be changed, so that when changing the setting of the recording direction, the operation for confirming the consistency with the setting of the blank space elimination function at this time can be omitted, the operation burden can be reduced, and the operability can be improved. Even if the confirmation when changing the setting of the recording direction is forgotten, recording with erroneous settings is prevented, so that the feeling of burden of an operator who makes settings by operating a computer can be reduced.

According to an aspect of at least one embodiment of the invention, there is also provided a computer-readable recording medium in which a computer program causing a computer to execute the recording control method is recorded.

This invention can be also applied to various recording medium such as a magnetic recording medium such as a flexible disk or a hard disk drive, a magneto optical recording medium such as an MO, an optical recording medium such as a CD-R, a CD-RW, a DVD±R, a DVD±RW, or a DVD-RAM, and a storage unit using a semiconductor storage device.

With this medium, information designating a recording direction of a recording object document and information on a blank space elimination function are input, and in a state where settings relating to the recording direction and the blank space elimination function are made based on these peaces of information, when information showing a recording direction of the recording object document is newly input, it is determined whether the setting relating to the blank space elimination function needs to be changed, so that when changing the setting of the recording direction, the operation for confirming the consistency with the setting of the blank space elimination function at this time can be omitted, the operation burden can be reduced, and the operability can be improved. Even if the confirmation when changing the setting of the recording direction is forgotten, recording with erroneous settings is prevented, so that the feeling of burden of an operator who makes settings by operating a computer can be reduced.

According to an aspect of at least one embodiment the invention, when changing the setting of the recording direction, the operation for confirming the consistency with the setting of the blank space elimination function can be omitted, the operation burden is reduced, and the operability can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment to which the present invention is applied will be described with reference to the drawings.

Figure 1:
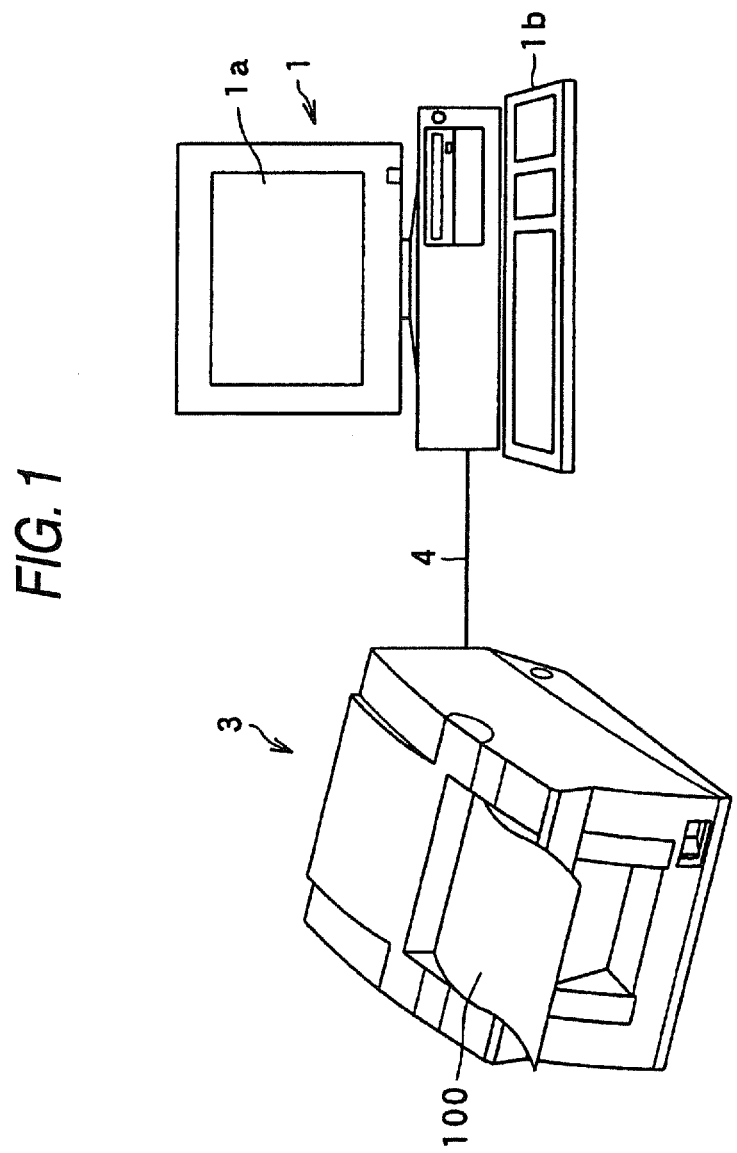
FIG. 1 is a view showing a schematic configuration of a host computer of an embodiment.

FIG. 1 is a view showing a schematic configuration of a host computer 1 of an embodiment of the present invention.

To the host computer 1 (recording control device), a printer 3 (recording apparatus) is connected via a cable 4. The printer 3 is a thermal printer that uses a roll paper 100 formed by rolling a thermosensitive paper as a recording medium, and records images including characters thereon by a thermal head in contact with a printing surface of the roll paper 100. The printer 3 has a cutter mechanism installed inside that cuts the roll paper 100 in the width direction. The host computer 1 transmits data of a print job including image data and control data to the printer 3 via the cable 4, and by controlling the printer 3, makes the printer 3 print images on the roll paper 100. The host computer 1 is a computer including a display 1a (display screen) for displaying various images and video images, and a keyboard 1b that is operated by an operator, and so on.

Figure 2:
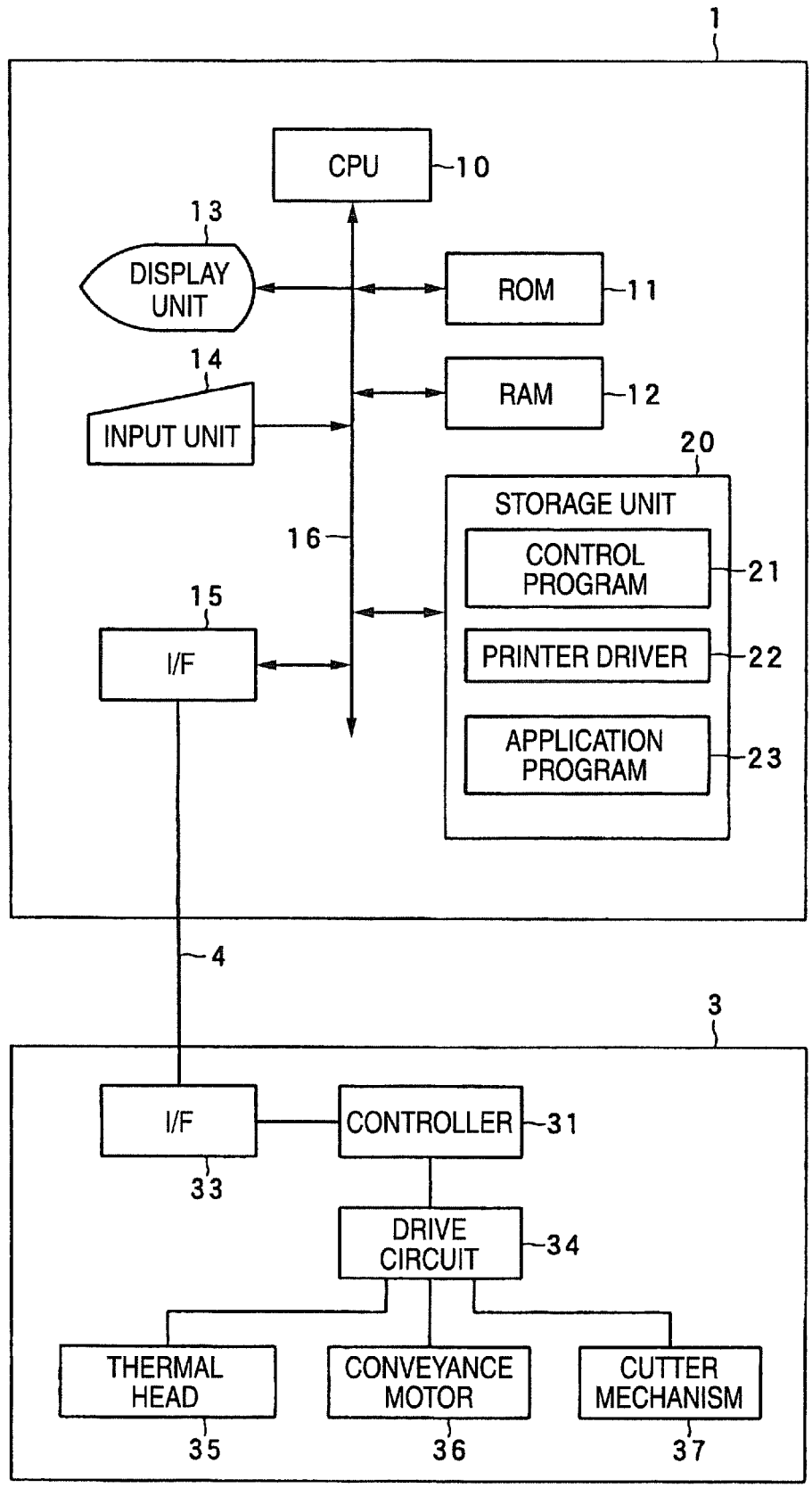
FIG. 2 is a block diagram showing a configuration of the host computer and a printer.

FIG. 2 is a block diagram showing a configuration of the host computer 1 and the printer 3.

The host computer 1 includes a CPU (Central Processing Unit) 10 that controls the host computer 1 and the printer 3 by executing various programs, a ROM (Read Only Memory) 11 that stores a basic control program, etc., to be executed by the CPU 10, a RAM (Random Access Memory) 12 that temporarily stores programs to be executed by the CPU 10 and data to be processed, etc., a display unit 13 that displays various screens on the display 1a (FIG. 1), an input unit 14 (input section) that includes input devices such as the keyboard 1b (FIG. 1) and a mouse, etc., and detects inputs of operations of these input devices, an interface (I/F) 15 that is connected to the printer 3 via the cable 4, and a storage unit 20 that stores various data and programs, and these sections are connected to each other via a bus 16.

The CPU 10 reads out the basic control program stored in the ROM 11 and develops it in a work area provided in the RAM 12 and executes it to control the respective sections of the host computer 1. The CPU 10 reads out a control program 21 and an application program 23 described later from the storage unit 20 to realize various functions of the host computer 1. Further, the CPU 10 functions as a setting section, a recording control section, and a display control section according to an embodiment of the present invention by reading a printer driver 22 described later from the storage unit 20 and executing it, the CPU makes settings relating to the operations of the printer 3, and the CPU controls the printer 3 according to the settings.

The ROM 11 is a nonvolatile storage unit that stores the basic control program, etc., to be executed by the CPU 10. The RAM 12 is configured by using a volatile memory element, etc., and forms a work area to be used by the CPU 10.

The storage unit 20 stores various programs and data in a storage region consisting of a magnetic or optical storage medium or semiconductor memory element, etc. For example, the storage unit 20 stores the control program 21 for initializing the respective sections of the host computer 1 and controlling the host computer 1 in response to a request from the application program 23, the printer driver 22 (corresponding to the program of the present embodiment) for controlling the printer 3, the application program 23 for realizing a specific function by the host computer 1, and so on.

The display unit 13 displays various screens on the display 1a consisting of a CRT or liquid crystal display panel according to the control of the CPU 10. The input unit 14 includes input devices such as a keyboard 1b, a mouse, a tablet, or a touch panel superimposed on the display 1a, and analyzes operation signals input from these input devices and outputs input contents to the CPU 10.

The interface 15 communicates with the printer 3 via the cable 4 according to the control of the CPU 10. In detail, the interface 15 transmits data of a print job generated by the CPU 10 as described later to the printer 3 via the cable 4.

On the other hand, the printer 3 includes a controller 31 that controls the respective sections of the printer 3, an interface (I/F) 33 that makes communications via the cable 4 according to the control of the controller 31, and a drive circuit 34 that drives a thermal head 35, a conveyance motor 36, and a cutter mechanism 37 according to the control of the controller 31.

The thermal head 35 connected to the drive circuit 34 is a printer head that is loaded with a plurality of heating elements, and prints images on the roll paper 100 by coming into contact with the roll paper 100 (FIG. 1) and heating the heating elements. The drive circuit 34 energizes the heating elements of the thermal head 35 according to the control of the controller 31 to make the heating elements heat at a necessary timing.

The conveyance motor 36 includes a conveyance motor (not shown) configured by using, for example, a stepping motor, and conveyance rollers (not shown) that are driven to rotate by this conveyance motor. Herein, the conveyance rollers may commonly perform the function of a platen, which faces the thermal head 35 and sandwiches the roll paper 100 between the same and the thermal head 35, and the number of conveyance rollers is not limited. By outputting a drive current and a drive pulse to the conveyance motor 36 according to the control of the controller 31, the drive circuit 34 rotates the conveyance motor 36 by a necessary amount at a necessary timing.

The cutter mechanism 37 is provided in a conveyance path that the roll paper 100 passes after images are recorded thereon by the thermal head 35, and includes a cutter (not shown) that cuts the roll paper 100 in the width direction and a cutter driver (not shown) that drives the cutter. The cutter has a fixed blade facing across the conveyance path of the roll paper 100, and one or a plurality of movable blades that are driven by the cutter driver so as to mesh with the fixed blade.

This cutter is capable of both completely cutting the roll paper and cutting while leaving a small end or central portion of the roll paper by adjusting the driving amount of the movable blade. The drive circuit 34 energizes the cutter driver (not shown) according to the control of the controller 31 and moves the movable blade by a necessary amount at a necessary timing.

The interface 33 executes communications with the host computer 1 according to the control of the controller 31, receives data of a print job transmitted from the host computer 1, and outputs it to the controller 31.

The controller 31 analyzes the data of the print job received via the interface 33, and develops image data to be printed on the roll paper 100 into a memory installed inside. The controller 31 extracts control data for designating printing conditions when printing and operations before and after printing, and operates according to the control data. The control data includes the size of the roll paper 100, print density, etc., when printing, or information designating an operation of the cutter mechanism 37, and so on.

The controller 31 controls the drive circuit 34 according to the control data and the image data, operates the conveyance motor 36 and the cutter mechanism 37 for realizing the operations designated by the control data, and drives the thermal head 35 to perform printing as shown by the image data developed in the memory installed inside. Accordingly, under control of the host computer 1, the printer 3 prints and outputs images on the roll paper 100.

Figure 3:
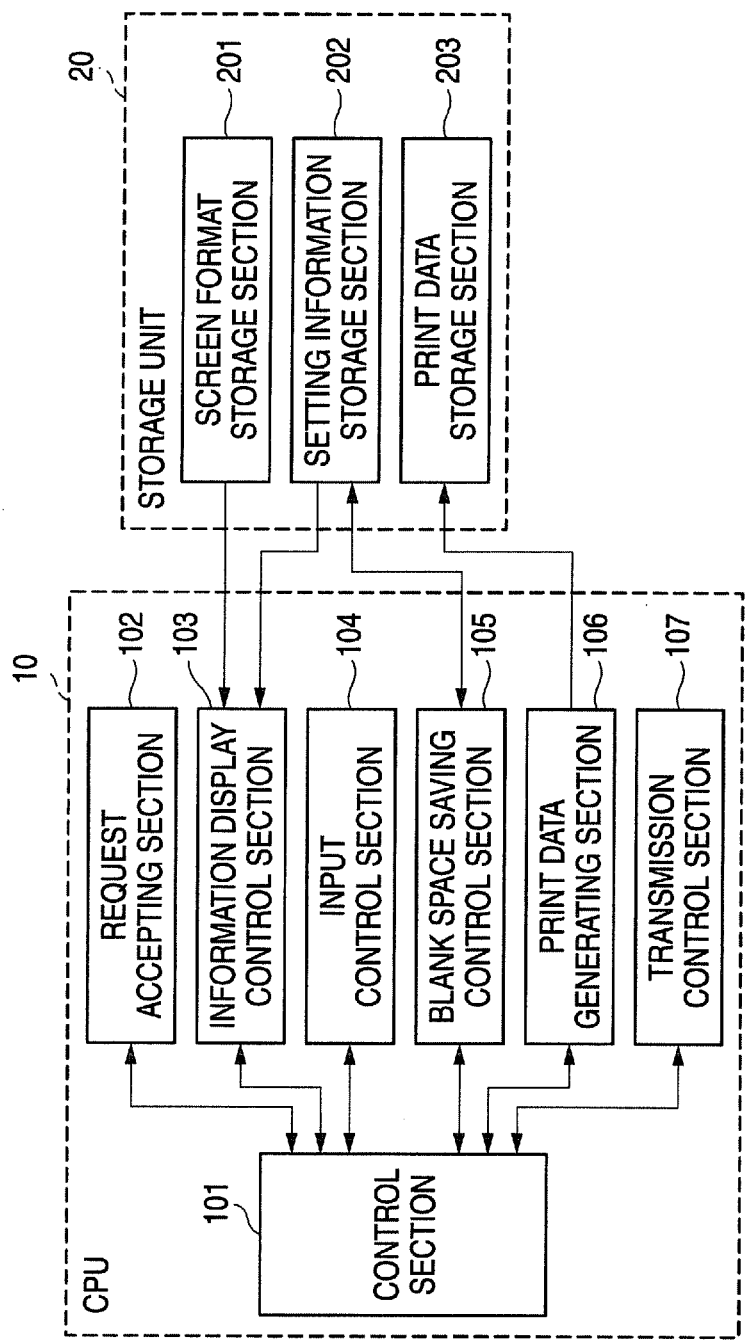
FIG. 3 is a functional block diagram showing a configuration that is realized by the printer driver.

FIG. 3 is a functional block diagram showing a configuration of functions that are realized by the host computer 1 (FIG. 2) when executing the printer driver 22 (FIG. 2). The functional blocks shown in FIG. 3 are virtually realized by the CPU 10 and the storage unit 20. The configuration shown in FIG. 3 corresponds to the recording control device of the present embodiment.

The CPU 10 includes a request accepting section 102, an information display control section 103 (display control section), an input control section 104, a blank space saving control section 105 (setting section), a print data generating section 106, a transmission control section 107, and a control section 101 that controls these sections.

The request accepting section 102 accepts a print request with respect to the printer 3 from the application program 23 (FIG. 2) together with a printing object document.

The information display control section 103 displays information on the settings of the printer 3 corresponding to the printing object document (recording object document) accepted by the request accepting section 102 on the display screen of the display unit 13 based on a screen format stored in a screen format storage section 201 of the storage unit 20 and setting information stored in the setting information storage section 202.

Concerning information on the settings of the printer 3 displayed by the information display control section 103, when selection or input of desired information is made by an operation on the input unit 14, the input control section 104 accepts this input. In this embodiment, as described later, various items including the printing direction on the roll paper 100 and setting items relating to the blank space saving function, can be set by the input unit 14.

The blank space saving function (blank space elimination function) realized in the printer 3 under control of the host computer 1 will be described as follows.

Figure 4A:
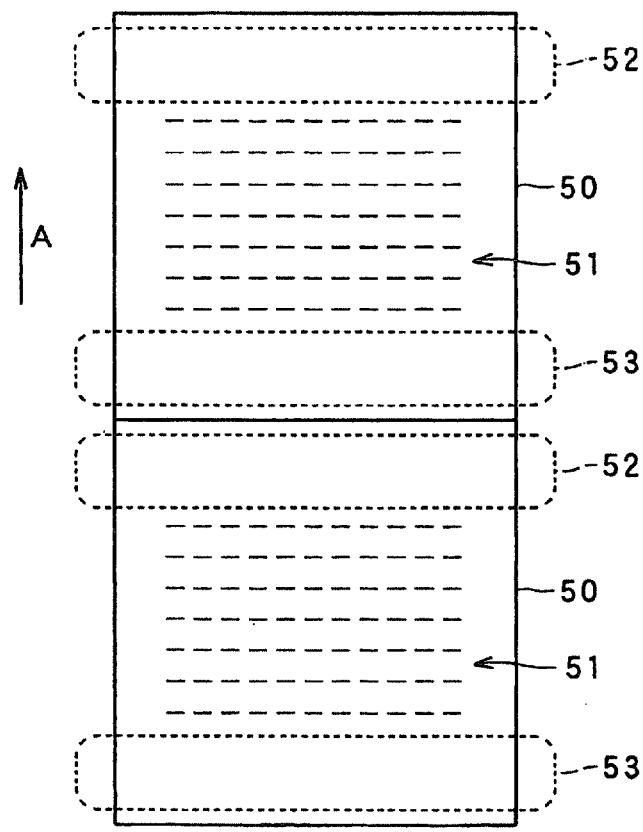
FIGS. 4A and 4B are views describing a blank space saving function.
Figure 4B:
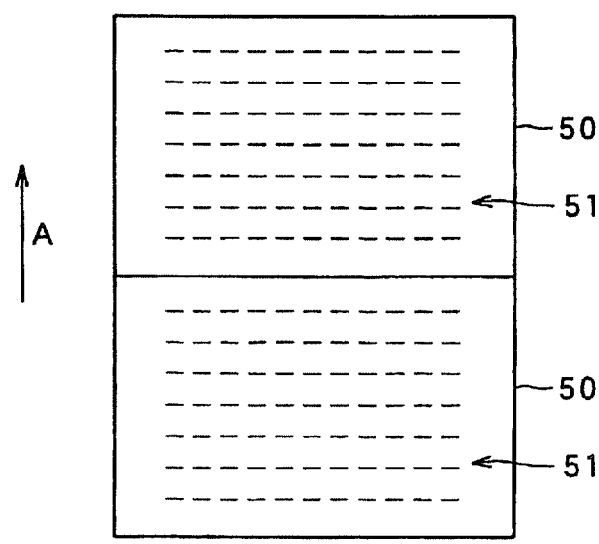

FIGS. 4A and 4B are views describing the blank space saving function. FIG. 4A shows a printing state when the blank space saving function is not used, and FIG. 4B shows a printing state when blank spaces are eliminated by the blank space saving function.

As shown in FIG. 4A, in many printing object document data 50, above and below a printing portion 51 in which characters and images are arranged, an upper blank space 52 and a lower blank space 53 are present. For example, in a case of a document written horizontally, a line extending in the horizontal direction extends on upper and lower portions of a roll paper 100. Therefore, the size of the lower blank space 53 changes according to the length, the character size, line spacing, longitudinal size of a page, the number of lines per page, and a position of a page break, etc., of the document. An absolute size of the lower blank space 53 that should be minimized may be input from the input control section 104. On the other hand, the upper blank space 52 is determined according to the character size, line spacing, the longitudinal size of the page and the number of lines per page regardless of the length of the document, and an absolute size of the upper blank space 52 may be input from the input control section 104.

In the case of printing the printing object document data 50 as shown in FIG. 4A on the long-length roll paper 100, when the upper blank spaces 52 and the lower blank spaces 53 are not necessary, portions corresponding to the upper blank spaces 52 and the lower blank spaces 53 are eliminated and only the printing portions 51 are printed, and accordingly, the roll paper 100 is saved. In this case, the length of one page of the printing object document data 50 changes according to the lengths of the printing portions 51 of each page, so that the size of one page is not constant. However, when this feature is advantageous, the roll paper 100 can be saved.

Therefore, the host computer 1 has a blank space saving function for printing only the printing portions 51 on the roll paper 100 (as shown in FIG. 4B) by controlling the printer 3. This blank space saving function can be configured to eliminate all of the upper blank spaces 52 and the lower blank spaces 53 as shown in FIG. 4B, or configured to eliminate either the upper blank spaces 52 or the lower blank spaces 53.

As shown in FIG. 4B, when the blank space saving function is used, it is influenced by the relationship between the conveyance direction of the roll paper 100 shown by the reference symbol A in the drawing and the printing direction of the printing object document data 50 (longitudinal direction of the page).

In other words, in the printer 3, the conveyance direction A of the roll paper 100 and the printing direction of the printing object document data 50 can be designated in units of 90 degrees. For example, in addition to the case where the conveyance direction A and the printing direction match each other as shown in FIG. 4A and FIG. 4B, the longitudinal direction of the printing object document data 50 can be rotated clockwise by 90 degrees, 180 degrees, and 270 degrees from the state shown in FIG. 4A and FIG. 4B. For example, when it is rotated by 180 degrees, the printing object document data 50 is turned upside down from the state shown in FIG. 4A and FIG. 4B.

When executing the blank space saving function, the CPU 10 of the host computer 1 generates printing image data by eliminating the blank spaces instructed to be eliminated of the upper blank spaces 52 and the lower blank spaces 53 of the original printing object document. Therefore, when it is set to delete the upper blank spaces 52 in the printing direction shown in FIG. 4A and then the printing direction is rotated by 180 degrees, the image data in which the upper blank spaces 52 were deleted is rotated by 180 degrees, so that a lower blank space 53 is positioned at the head of the roll paper 100.

Therefore, although it should be set to eliminate the blank space on the upper end of the roll paper 100, in actuality, a blank space is arranged at the upper end of the roll paper 100.

Therefore, when the setting of the printing direction is changed in a state where it is set to delete at least either the upper blank spaces 52 or the lower blank spaces 53 by the blank space saving function, according to this printing direction change, the setting of the blank spaces to be deleted by the blank space saving function is changed.

Specifically, when an input is made so as to rotate the setting of the printing direction by 180 degrees or 270 degrees from the current setting in the state where it is set to delete only either the upper blank spaces 52 or the lower blank spaces 53 by the blank space saving function, the setting is changed so as to turn the blank spaces to be deleted upside down. This is because the printing direction change that involves rotation exceeding 90 degrees substantially results in turning upside down of the printing object document. According to this change, when it is set to delete the upper blank spaces 52, this setting is changed into a setting to delete the lower blank spaces 53, and when it is set to delete the lower blank spaces 53, this setting is changed into a setting to delete the upper blank spaces 52. When the printing direction is rotated by more than 270 degrees, the relative relationship between the positions of the upper and lower blank spaces within a page and the conveyance direction of the roll paper 100 exceeds the state where the positions are turned upside down, and in this case, the setting change relating to the blank space saving function is not made. Similarly, when the printing direction is changed to rotate by not more than 90 degrees from the current direction, the CPU 10 does not make the setting change relating to the blank space saving function. Also, when it is set to delete or not to delete both of the upper blank spaces 52 and the lower blank spaces 53 by the blank space saving function, the CPU 10 does not make the setting change relating to the blank space saving function.

The blank space saving control section 105 sets whether the blank spaces are to be deleted by the blank space saving function and positions of the blank spaces to be deleted by the blank space saving function among the blank spaces of the printing object document based on information on the blank space saving function of the printer 3, which accepted the blank space saving control section accepted by the input control section 104, and stores these in a setting information storage section 202.

When an input for changing the printing direction is made from the input control section 104 in the state with a setting to delete blank spaces by the blank space saving function, the blank space saving control section 105 determines whether the setting relating to the blank space saving function needs to be changed in conjunction with the printing direction change. Then, when it is determined that the settings need to be changed, the blank space saving control section 105 automatically changes the setting relating to the blank space saving function and stores the changed settings in the setting information storage section 202.

The print data generating section 106 generates image data to be printed on the roll paper 100 based on data of a printing object document outputted by the application program 23 according to a request that the request accepting section 102 accepted from the application program 23. This image data reflects the printing direction and setting of the blank space saving function stored in the setting information storage section 202. The print data generating section 106 generates data of a print job by combining this image data and control data for designating an operation of the cutter mechanism 37 when printing and the size, etc., of the roll paper 100. This data of the print job is stored in the print data storage section 203 of the storage unit 20.

A transmission control section 107 transmits the data of the printing job generated by the print data generating section 106 to the printer 3 together with a printing request command for requesting execution of printing. It is also allowed that the data of the printing job itself commonly serves as a printing request command.

The printer 3 operates as it is set according to data of a job generated and transmitted by the print data generating section 106 and the transmission control section 107, which operate as recording control sections.

The control section 101 controls the the request accepting section 102, the information display control section 103, the input control section 104, the blank space saving control section 105, the print data generating section 106, and the transmission control section 107 by associating these sections with each other.

When executing the printer driver 22, the storage unit 20 functions as the screen format storage section 201, the setting information storage section 202, and the print data storage section 203. The image format storage section 201 is a region for storing data of a screen format for displaying a setting screen, etc., on the display screen of the display unit 13 by the information display control section 103 as described above. The setting information storage section 202 is a region for storing setting information on the operations of the printer 3 input by the input control section 104, and the print data storage section 203 stores the data of the print job generated by the print data generating section 106.

Figure 5:
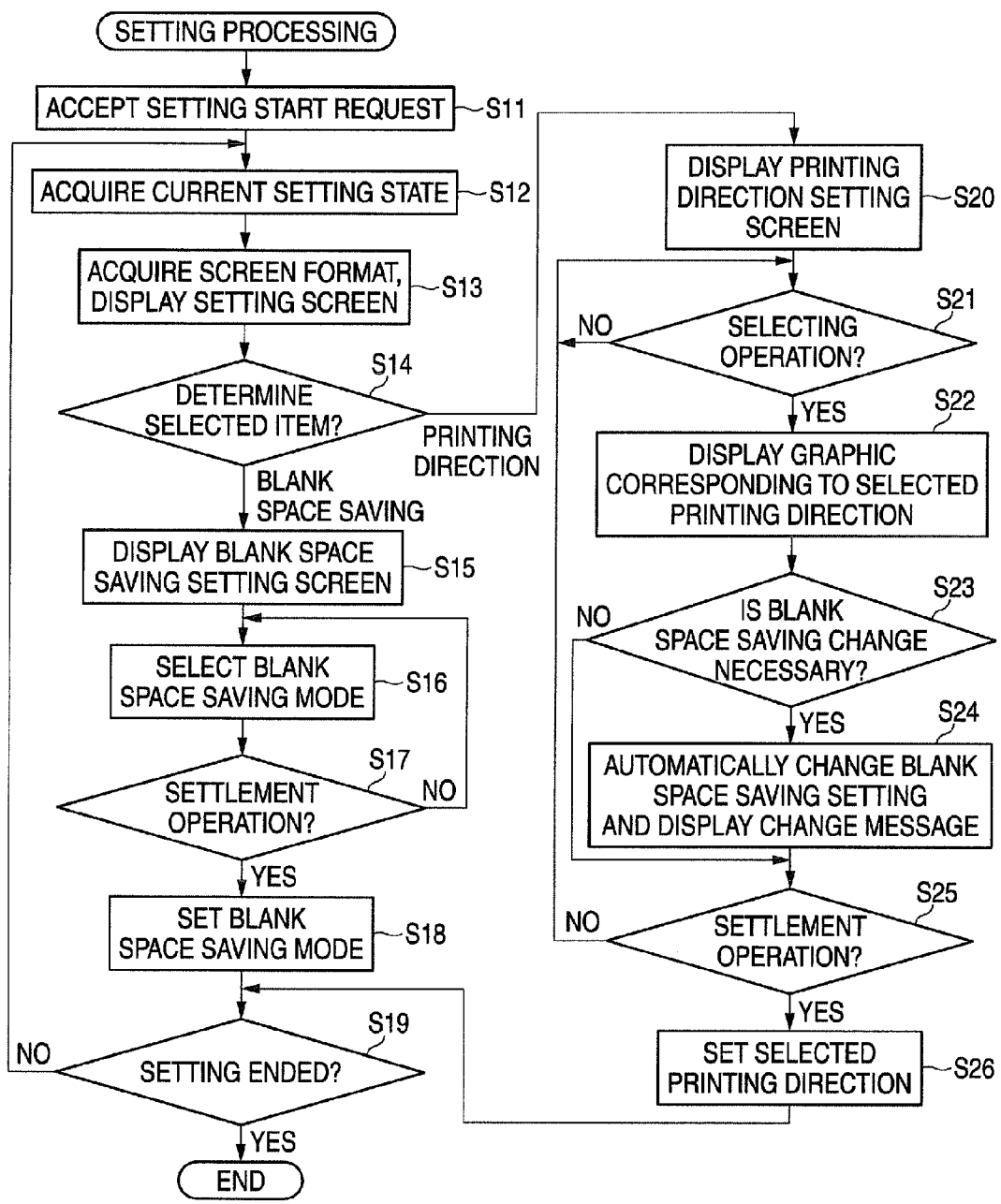
FIG. 5 is a flowchart showing operations of the host computer.

FIG. 5 is a flowchart showing operations of the host computer 1 during execution of the printer driver 22, and in particular, operations when various settings relating to printing are made.

When a setting start request is issued according to an operation on the input unit 14 (Step S11), the CPU 10 acquires a current setting state stored in the setting information storage section 202 as a function of the information display control section 103 (Step S12), and further acquires the screen format stored in the image format storage section 201, and displays the setting screen on the display 1a (Step S13).

Herein, as a function of the input control section 104, the CPU 10 detects operations of the input unit 14 during display of the setting screen in a state where the setting screen is displayed and determines the items that were selected as items to be set (Step S14).

When the selected setting item is a blank space saving function, the CPU 10 displays a blank space saving setting screen on the display 1a according to the function of the information display control section 103 (Step S15).

Figure 7:
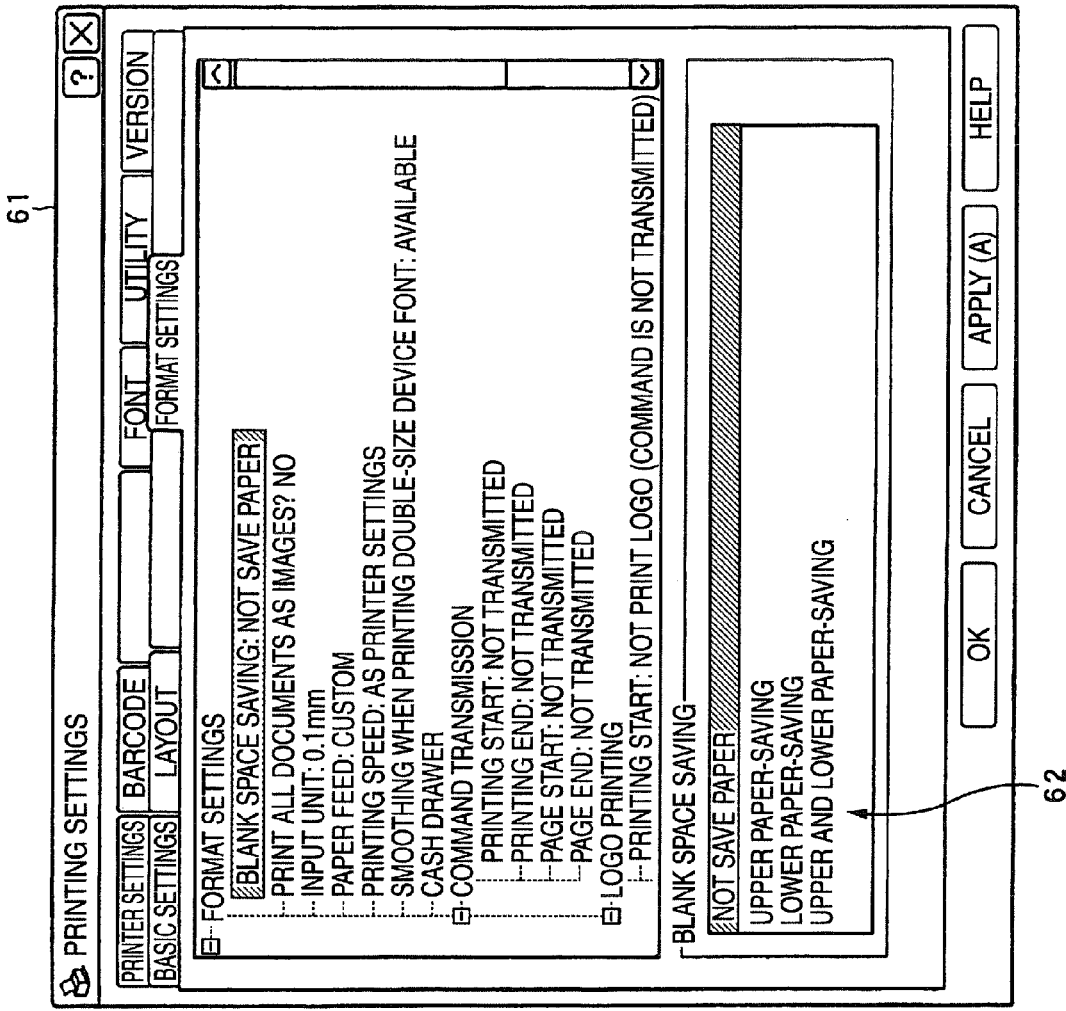
FIG. 7 is a view showing a configuration example of a screen displayed on the display when setting.

FIG. 7 is a view showing a configuration example of the blank space saving setting screen 61 to be displayed on the display 1a at Step S15 of FIG. 5 described above.

In the example shown in FIG. 7, a list of items settable as format settings is shown on the upper portion of the screen. When blank space saving is selected as a setting object item, a selected setting portion 62 appears on the lower portion of the screen, and blank space saving modes selectable in this selection setting portion 62 are listed. As blank space saving modes, an "upper paper saving" mode in which only the upper blank spaces 52 (FIG. 4A) are deleted, an "lower paper saving" mode for deleting only the lower blank space 53 (FIG. 4A), and an "upper and lower paper saving" mode for deleting both of the upper blank spaces 52 and the lower blank spaces 53 are provided. These three blank space saving modes include settings of whether the upper and lower blank spaces of the printing object document are to be deleted, and on the selection setting portion 62, a selection candidate for another setting that the blank space saving function is not to be used, "no paper saving," is also displayed. Simply by an operation of selecting one of the selection candidates listed on the selection setting portion 62, the setting of the blank space saving function can be easily made.

Returning to FIG. 5, when the input unit 14 is operated in a state where the blank space saving setting screen is displayed, the CPU 10 identifies the contents of the operation by the function of the input control section 104, and identifies the selected blank space saving mode (Step S16).

After the blank space saving mode is selected and a settlement operation is performed (Step S17: Yes), the CPU 10 makes the setting information storage section 202 store the selected blank space saving mode (Step S18), and then shifts the process to Step S19.

At Step S19, the CPU 10 determines whether the setting operation is to be ended, and when an input operation for ending the setting is made from the input unit 14, the CPU 10 ends this process, and returns the process to Step S12 when setting is continued.

On the other hand, if the setting item selected is the printing direction when the setting screen is displayed, the CPU 10 displays the printing direction setting screen on the display 1a by the function of the information display control section 103 (Step S20).

Figure 8:
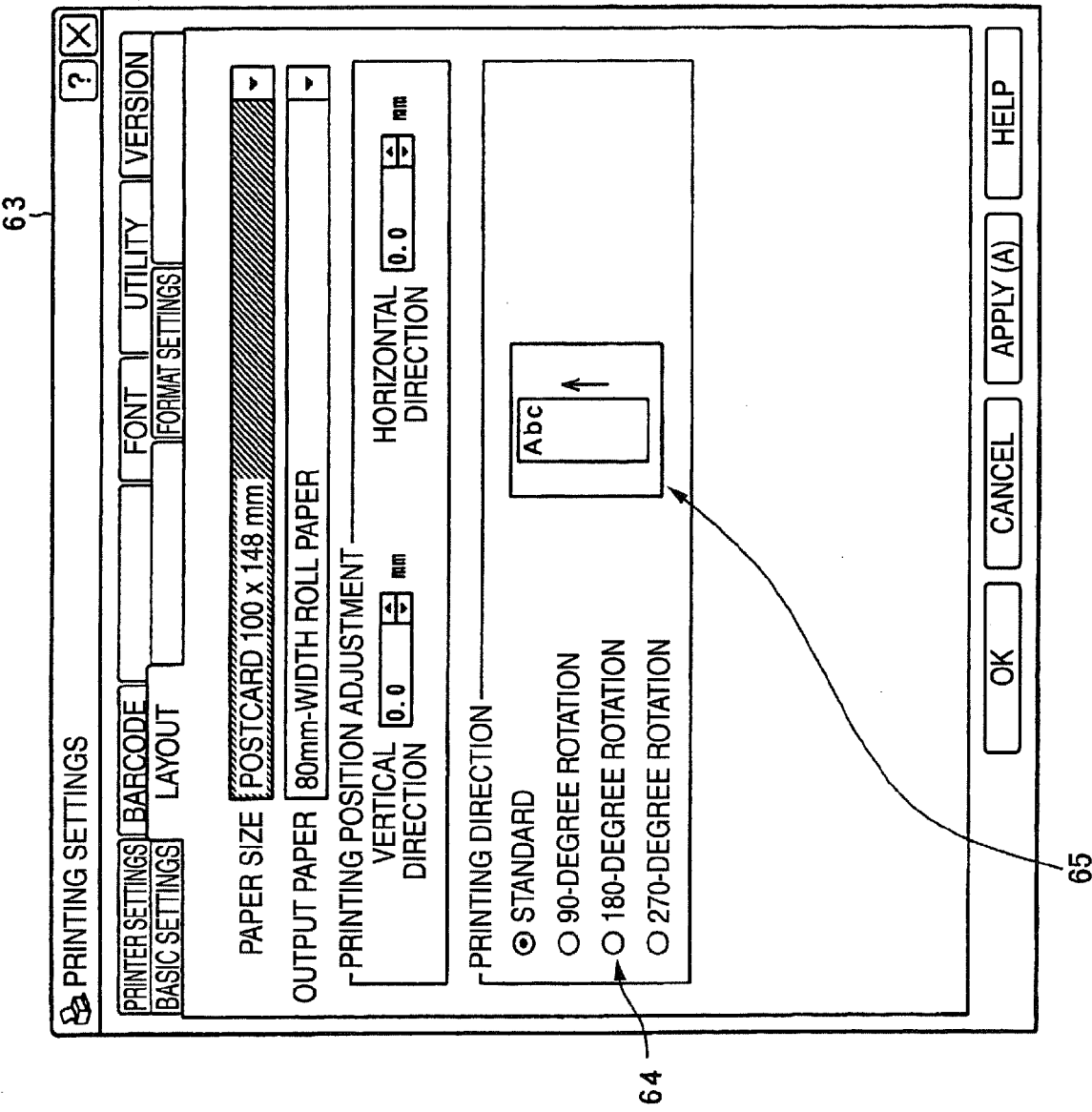
FIG. 8 is a view showing a configuration example of another screen displayed on the display when setting.

FIG. 8 is a view showing a configuration example of the printing direction setting screen 63 to be displayed on the display 1a at Step S20 of FIG. 5 described above. FIGS. 9A to 9E are views showing configuration examples of images, etc., to be displayed on the display 1a in conjunction with an operation on the printing direction setting screen 63, FIG. 9A to FIG. 9D show description graphic examples described later, and FIG. 9E shows a configuration example of a message 66.

The printing direction setting screen 63 shown in FIG. 8 enables adjustments, etc., of the size of the roll paper 100 and the printing position concurrently, and at substantially the center of the screen, a printing direction selecting portion 64 is arranged. On the printing direction selecting portion 64, four printing directions are listed so as to be selected by a radio button. Among the printing directions selectable on the printing direction selecting portion 64, "standard" indicates a state where the conveyance direction of the roll paper 100 and the longitudinal direction of the printing object document match each other, and by defining this state as a reference, the printing direction can be set so as to rotate the longitudinal direction of the printing object document clockwise. For example, as shown in FIG. 8, the printing direction can be set to four patterns including "90-degree rotation," "180-degree rotation," "270-degree rotation," and the above-described "standard."

When one of the printing directions is selected on the printing direction selecting portion 64 by a radio button, a description graphic corresponding to the selected printing direction is displayed on a description graphic display portion 65 arranged aside of the printing direction selecting portion 64.

The description graphic to be displayed on the description graphic display portion 65 is, for example, as illustrated in FIG. 9A to FIG. 9D, an image that visually shows a printing direction by combining an arrow showing a conveyance direction of the roll paper 100 and a character string clearly showing the orientation of the printing object document. The character string in the description graphic shows a printing direction according to the horizontally-written printing object document, and this is for intuitively knowing the printing direction, and the setting of the printing direction is also effective when printing a vertically-written printing object document.

Figure 9A:
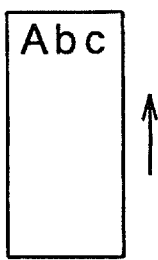
FIGS. 9A to 9E are views showing examples of images, etc., displayed on the display when setting.
Figure 9B:
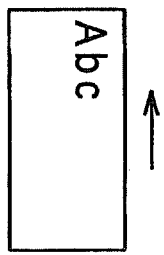
Figure 9C:
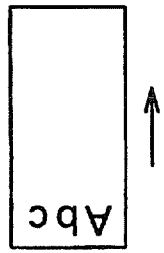
Figure 9D:
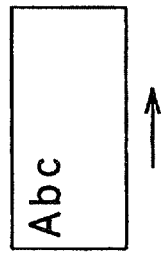
Figure 9E:
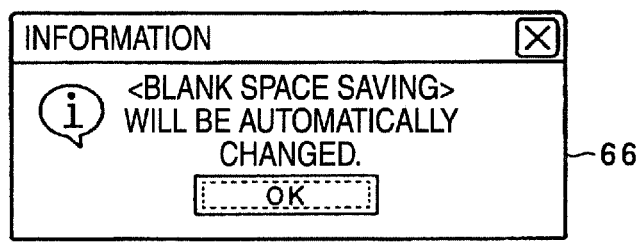

FIG. 9A shows an example of the description graphic that is displayed when "standard" in the printing direction selecting portion 64 (FIG. 8) is selected, and the conveyance direction of the roll paper 100 and the longitudinal direction of the printing object document match each other, and the front end side of the roll paper 100 and the head of the printing object document match each other. FIG. 9B shows a description graphic that is displayed when "90-degree rotation" in the printing direction selecting portion 64 is selected, FIG. 9C shows a description graphic that is displayed when "180-degree rotation" in the printing direction selecting portion 64 is selected, and FIG. 9D is a description graphic that is displayed when "270-degree rotation" is selected in the printing direction selecting portion 64. According to these description graphics of FIG. 9A to FIG. 9D, the relationship between the printing direction and the conveyance direction of the roll paper 100 is intuitively known by looking at the description graphic display portion 65, so that setting can be made by a simple operation without errors.

Returning to the flowchart of FIG. 5, when an operation for selecting a printing direction is performed on the printing direction setting screen (Step S21), the CPU 10 identifies the contents of the operation by the function of the input control section 104, and displays a description graphic corresponding to the selected printing direction on the display 1a by the function of the information display control section 103 (Step S22).

Herein, the CPU 10 determines whether the setting relating to blank space saving needs to be changed based on the difference between the printing direction selected on the printing direction setting screen and the currently set printing direction by the function of the blank space saving control section 105 (Step S23).

The criterion of the determination of Step S23 is, for example, whether both of the following conditions are satisfied:

1. Setting to delete only either the upper blank spaces or the lower blank spaces by the blank space saving function 2. The printing direction selected on the printing direction setting screen as described above is a direction of rotating the currently set printing direction exceeding 90 degrees but not more than 270 degrees.

Detailed examples of the condition 2 are the following four:

2-1. "180-degree rotation" or "270-degree rotation" is selected when "standard" is currently set 2-2. "270-degree rotation" or "standard" is selected when "90-degree rotation" is currently set 2-3. "standard" or "90-degree rotation" is selected when "180-degree rotation" is currently set 2-4. "90-degree rotation" or "180-degree rotation" is selected when "270-degree rotation" is currently set When the CPU 10 determines that the setting relating to blank space saving needs to be changed (Step S23: Yes), it changes the setting so as to turn the settings of the upper blank spaces and the lower blank spaces relating to the blank space saving function upside down, displays a message showing that the setting of blank space saving has been automatically changed on the display 1a (Step S24), and shifts the process to Step S25.

The message displayed on the display 1a at Step S24 is, for example, the message 66 illustrated in FIG. 9E.

When the CPU 10 determines that the setting relating to the blank space saving function does not need to be changed (Step S23: No), it directly shifts the process to Step S25.

At Step S25, the CPU 10 determines whether a settlement operation was performed, and when it was performed, the CPU stores the selected printing direction and the blank space saving mode in the setting information storage section 202 (Step S26), and shifts the process to Step S19.

Thus, when executing the printer driver 22, by performing an easy operation using the input unit 14 by utilizing the blank space saving setting screen 61 and the printing direction setting screen 63 displayed on the display 1a, the setting of the blank space saving function and the setting of the printing direction can be made. In the setting of the blank space saving function on the blank space saving setting screen 61, selection can be made simply by selecting a blank space saving combination listed on the selection setting portion 62. In the setting of the printing direction on the printing direction setting screen 63, a candidate on the printing direction selecting portion 64 is selected while confirming the printing direction by eye by looking at the description graphic displayed on the description graphic display portion 65, so that the setting can be made by an easy operation without errors.

Further, when the printing direction is set, the printing direction that had been set until this time is changed, so that the CPU 10 determines whether the setting of the blank space saving function needs to be changed in conjunction with this printing direction setting. Therefore, determination can be made so as to prevent inconsistency and confusion between the setting of the blank space saving function and the setting of the printing direction. Then, when the setting of the blank space saving function needs to be changed, it is automatically changed, so that inconsistency and confusion of the settings are eliminated without an operator's awareness, so that printing is performed as it is originally intended. When the setting was changed, the message 66 is displayed on the display 1a, so that an operator can know the setting change, and for example, the operator can make response such as reconfirmation.

Figure 6:
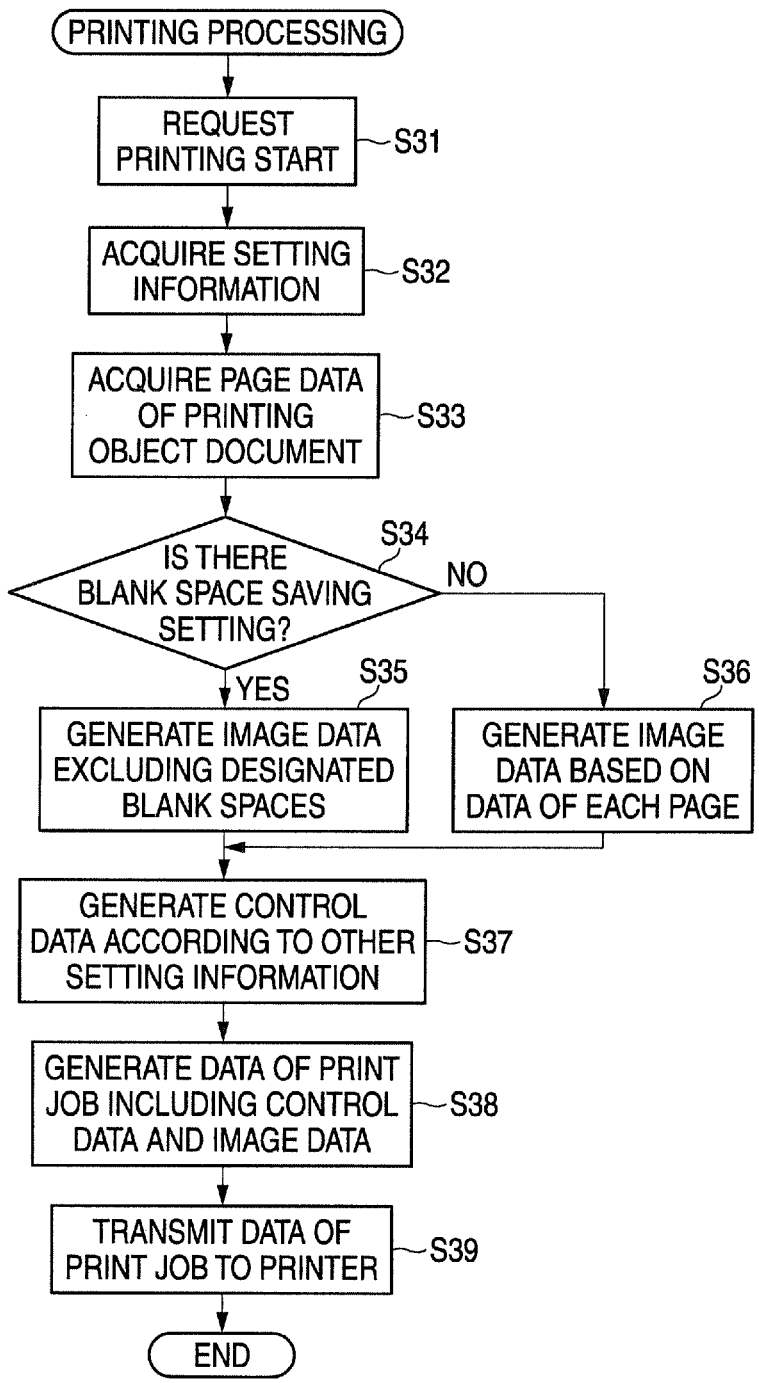
FIG. 6 is a flowchart showing other operations of the host computer.

FIG. 6 is a flowchart showing operations of the host computer 1 during execution of the printer driver 22, particularly showing operations relating to printing execution.

When a printing request is issued from the application program 23 being executed, the CPU 10 functions as the request accepting section 102 and accepts this request (Step S31). Subsequently, the CPU 10 acquires setting information stored in the setting information storage section 202 by the function of the information display control section 103 (Step S32), and then, by the function of the request accepting section 102, acquires data of a printing object document outputted by the application program (Step S33).

Herein, the CPU 10 determines whether there is a setting relating to the blank space saving function based on the settings stored in the setting information storage section 202 by the function as the blank space saving control section 105 (Step S34).

When there is a setting relating to the blank space saving function (Step S34: Yes), the CPU 10 generates printing image data excluding the blank spaces (upper blank spaces 52 or lower blank spaces 53 of FIG. 4A) designated by this setting based on data of each page of the printing object document (Step S35).

On the other hand, when it is set not to use the blank space saving function (Step S34: No), printing image data is generated based on data of each page of the printing object document (Step S36).

After the printing image data is generated, the CPU 10 generates control data according to other setting information (printing direction, etc.) acquired at Step S32 (Step S37), generates data of a print job including the generated control data and image data (Step S38), stores these data in the print data storage section 203, and transmits the data of the print job to the printer 3 by the function as the transmission control section 107 (Step S39), and then ends this processing.

In this operation, when generating printing image data at Steps S35 and S36, printing image data may be generated according to the setting of the printing direction. In this case, it is not necessary to set the printing direction in the control data, so that the printer 3 can directly print the image data included in the data of the print job transmitted from the host computer 1, and therefore, the processing burden on the printer 3 can be reduced and the function of the printer 3 can be simplified.

As described above, according to the host computer 1 of the embodiment to which the present invention is applied, by executing the printer driver 22, in a state where the settings relating to the printing direction of the printing object document and the blank space saving function are made, when information showing a printing direction is newly input by the input unit 14, the CPU 10 determines whether the setting relating to the blank space saving function needs to be changed. In other words, when an operation for changing the setting of the printing direction is performed, it is automatically determined whether the setting relating to the blank space saving function that is influenced by this operation should be changed. Accordingly, the operation for confirming the consistency with the setting of the blank space saving function when changing the setting of the printing direction can be omitted, the operation burden can be reduced, and the operability can be improved. Even if the confirmation when changing the setting of the printing direction is forgotten, printing with erroneous settings is prevented, so that the feeling of burden of an operator who makes settings can be reduced.

When the CPU 10 determines that the setting relating to the blank space saving function needs to be changed, it automatically changes the setting relating to the blank space saving function based on information newly input by the input unit 14, so that the operation for confirming the consistency with the setting state of the blank space saving function and an operation for changing this setting when changing the printing direction can be omitted, the operation burden is remarkably reduced, and the operability can be improved.

Further, even if the confirmation when changing the setting of the printing direction is forgotten, proper setting is made, so that the feeling of burden of an operator who makes settings can be remarkably reduced.

Additionally, concerning the blank space saving function, it can be set whether each blank space positioned on the upper portion or lower portion within the page of the printing object document is to be eliminated when printing, and this is advantageous so that when the up-down direction of the printing object document matches the conveyance direction of the roll paper 100, the roll paper 100 can be especially effectively saved. Further, by saving the use amount of the roll paper 100 in the printer 3, a great economical effect and an effect on environmental load can be obtained, and with this configuration, the operation burden is remarkably reduced and the operability is improved, and accordingly, both the economical effect and the effect on environmental load and operability can be concurrently obtained.

When information is input by the input unit 14, on the blank space saving setting screen 61 displayed on the display 1a, simply by selecting a selection candidate displayed on the selection setting portion 62, it can be easily set without errors whether the blank spaces positioned on the upper and lower portions of the page of the printing object document are to be eliminated.

Further, when the printing direction newly input by the input unit 14 is a direction rotated from the printing direction that has already been set exceeding 90 degrees but not more than 270 degrees, the settings of the blank spaces positioned on the upper and lower portions within the page are changed upside down. Therefore, according to the printing direction change, the settings can be properly changed so as to prevent the relative position of the conveyance direction of the roll paper 100 and the blank spaces to be eliminated from changing.

In the above-described embodiment, the printing direction when the host computer 1 executes the printer driver 22 can be set in four stages of 0 degrees, 90 degrees, 180 degrees, and 270 degrees in units of 90 degrees, however, the present invention is not limited to this, and for example, it may be configured so that an arbitrary angle can be input in units of 1 degree. In this case, the CPU 10 of the host computer 1 sets the input angle as the printing direction, and determines whether this printing direction is a direction rotated exceeding 90 degrees but not more than 270 degrees from the printing direction that has already been set, and when it is a direction rotated exceeding 90 degrees but not more than 270 degrees, the setting of the blank space saving function may be changed.

In the above-described embodiment, the configuration in which the host computer 1 and the printer 3 are directly preferentially connected to each other by the cable 4 is described, however, the present invention is not limited to this, and it is also allowed that the host computer 1 and the printer 3 are connected to a network (LAN, etc.), and the host computer 1 controls the printer 3 via this network to make the printer 3 perform printing, or an interface 15 of the host computer 1 and an interface 33 of the printer 3 are both radio communication interfaces.

Further, in the above-described embodiment, the case where the printer driver 22 to be executed by the CPU 10 is stored in advance in the storage unit 20 is described, however, it is also possible that the printer driver 22 is recorded in advance on a recording medium such as various magnetic disks, an optical disk, or a memory card, and from these recording mediums, the host computer 1 reads the printer driver 22 and installs it. It is also possible that a communication interface is provided so that the host computer 1 downloads the printer driver 22 via a network such as the Internet or LAN and installs and executes it.

Further, the case where the printer 3 is a thermal printer that records images on a thermosensitive roll paper 100 is described, however, the printer 3 may be any printer as long as it records images according to an instruction transmitted from the host computer 1, and its recording method is arbitrary. In detail, the present invention is also applicable to a so-called thermal transfer printer that uses, as a recording medium, a sheet that does not color such as a plain paper instead of the roll paper 100, and brings an ink ribbon to which an ink that melts due to heating adheres into contact with the sheet, and applies thermal energy to this ink ribbon to record images. Further, the present invention is also applicable to printers using various recording methods such as a dye sublimation printer that uses a sheet that does not color and sublimates an ink by heating and makes it adhere to the sheet, an ink-jet printer that records images by jetting or dripping a liquid or gel ink and making it adhere to a sheet, a laser printer that makes a toner, etc., adhere onto a photoreceptor by irradiating laser light onto the photoreceptor to form images, and transfers the images onto a sheet, a dot impact printer that puts an ink ribbon to which an ink adheres, on top of a sheet and makes the ink adhere to the sheet by impacting or pressurizing, and a printer that forms images by applying heat or pressure to a sheet to which capsulated colorant is attached. Further, the present invention is also applicable to a printer that is installed in various electronic devices or integrated with other electronic devices and functions as a multifunctional printer.

Similarly, the host computer 1 that controls the printer 3 is not limited to a personal computer, and it may be configured as a PDA (Personal Digital Assistant), or may be realized by a computer of an apparatus integrated with the printer 3 to be controlled. In this case, the apparatus main body including the printer 3 to be controlled is provided with a display screen corresponding to the display 1a and an input unit corresponding to the input unit 14 so that setting can be made by operating this apparatus main body while looking at the screen displayed by this apparatus main body by executing the printer driver 22.

As a matter of course, a detailed configuration of a mechanism, etc., for conveying the roll paper 100 in the printer 3 is also arbitrarily changeable.

What is claimed is:

1. A recording control device comprising:
an input section that inputs information on a recording direction of a recording object document and information on a blank space elimination function for recording by eliminating blank spaces in the recording object document;
a setting section that performs settings relating to the recording direction of the recording object document and the blank space elimination function based on the information input by the input section;
a recording control section that controls a recording apparatus to record the recording object document on a recording medium according to the settings performed by the setting section; and
a determining section that determines whether the setting relating to the blank space elimination function needs to be changed when information on a recording direction of the recording object document is newly input by the input section in a state where the setting section has performed the settings relating to the recording direction of the recording object document and the blank space elimination function;
wherein the setting section automatically changes the setting relating to the blank space elimination function based on the information newly input by the input section when the determining section determines that the setting relating to the blank space elimination function needs to be changed,
wherein the setting section sets whether a blank space positioned on an upper portion and a blank space positioned on a lower portion within a page of the recording object document are to be eliminated when recording, as the information on the blank space elimination function, based on the information input by the input section,
wherein the determining section determines that the setting relating to the blank space elimination function needs to be changed when the recording direction of the recording object document newly input by the input section is a direction rotated the recording direction of the recording object document that has already been set by the setting section exceeding 90 degrees but not more than 270 degrees, and wherein the setting section changes the settings for the blank space positioned on the upper portion and the blank space positioned on the lower portion within the page of the recording object document upside down when the determining section determines that the setting relating to the blank space elimination function needs to be changed.

2. The recording control device according to claim 1, wherein when the information is input by the input section, selection candidates corresponding to combinations showing whether the blank space positioned on the upper portion and the blank space positioned on the lower portion within the page of the recording object document are to be eliminated when recording are listed on a display screen in a selectable manner, and the recording control device comprises a display control section that displays notification of a setting change on the display screen when the setting is automatically changed by the setting section based on determination made by the determining section.

3. The recording control device according to claim 1, wherein the recording medium is a rolled long-length recording sheet.

4. A recording control method comprising:

when information on a recording direction of a recording object document and information on a blank space elimination function for recording by eliminating blank spaces in the recording object document are input, performing settings relating to the recording direction of the recording object document and the blank space elimination function based on the input information;

controlling a recording apparatus to record the recording object document on a recording medium according to the settings; and determining whether the setting relating to the blank space elimination function needs to be changed when information on a recording direction of the recording object document is newly input in a state where the settings relating to the recording direction of the recording object document and the blank space elimination function have been performed, wherein the setting relating to the blank space elimination function is automatically changed based on the newly input information when it is determined that the setting relating to the blank space elimination function needs to be changed in the determining step, wherein, in the performing step, a setting as to whether a blank space positioned on an upper portion and a blank space positioned on a lower portion within a page of the recording object document are to be eliminated when recording, as the information on the blank space elimination function, is performed based on the input information, wherein, in the determining step, it is determined that the setting relating to the blank space elimination function needs to be changed when the recording direction of the recording object document in the newly input information is a direction rotated from the recording direction of the recording object document that has already been set exceeding 90 degrees but not more than 270 degrees, and wherein the settings for the blank space positioned on the upper portion and the blank space positioned on the lower portion within the pace of the recording object document are changed upside down when it is determined that the setting relating to the blank space elimination function needs to be changed.

5. A non-transitory computer-readable recording medium in which a computer program causing a computer to execute the recording control method according to claim 4 is recorded.

6. A recording control device comprising:

an input section that is adapted to input information on a recording direction of recording object document data and information on a blank space elimination function for recording by eliminating blank spaces included in the recording object document data;

a setting section that is adapted to perform settings relating to the recording direction of the recording object document data and the blank space elimination function based on the information input by the input section;

a recording control section that is adapted to control a recording apparatus to record the recording object document data on a recording medium according to the settings performed by the setting section; and a determining section that is adapted to determine whether the setting relating to the blank space elimination function needs to be changed when information on a recording direction of the recording object document data is newly input by the input section in a state where the setting section has performed the settings relating to the recording direction of the recording object document data and the blank space elimination function, wherein the setting section automatically changes the setting relating to the blank space elimination function based on the information newly input by the input section when the determining section determines that the setting relating to the blank space elimination function needs to be changed, wherein the setting section sets whether a blank space positioned on an upper portion and a blank space positioned on a lower portion within a page of the recording object document data are to be eliminated when recording, as the information on the blank space elimination function, based on the information input by the input section, wherein the determining section determines the setting relating to the blank space elimination function needs to be changed when the recording direction of the recording object document data newly input by the input section is a direction rotated from the recording direction of the recording object document data that has already been set by the exceeding 90 degrees but not more than 270 degrees, and wherein the setting section changes the settings for the blank space positioned on the upper portion and the blank space positioned on the lower portion within the page of the recording object document data upside down when the determining section determines that the setting relating to the blank space elimination function needs to be changed.

* * * * *